United States Patent
Umeda et al.

(10) Patent No.: US 9,355,783 B2
(45) Date of Patent: May 31, 2016

(54) VARIABLE CAPACITANCE DEVICE

(75) Inventors: Keiichi Umeda, Nagaokakyo (JP);
Teruhisa Shibahara, Nagaokakyo (JP);
Hiroshi Yamada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 218 days.

(21) Appl. No.: 13/452,971

(22) Filed: Apr. 23, 2012

(65) Prior Publication Data

US 2012/0206857 A1    Aug. 16, 2012

Related U.S. Application Data

(63) Continuation of application No. PCT/JP2010/066643, filed on Sep. 27, 2010.

(30) Foreign Application Priority Data

Nov. 11, 2009 (JP) .................................. 2009-258302

(51) Int. Cl.
| | |
|---|---|
| *H01G 7/00* | (2006.01) |
| *H01G 5/00* | (2006.01) |
| *H04R 25/00* | (2006.01) |
| *H01G 5/18* | (2006.01) |
| *H01G 5/011* | (2006.01) |

(52) U.S. Cl.
CPC . *H01G 5/18* (2013.01); *H01G 5/011* (2013.01)

(58) Field of Classification Search
CPC .......... G01N 27/233; H01G 5/18; H01G 5/16
USPC ........... 361/280, 281, 277, 271, 300; 381/174
See application file for complete search history.

(56) References Cited

U.S. PATENT DOCUMENTS

| | | | |
|---|---|---|---|
| 2002/0018334 A1* | 2/2002 | Hill et al. ....................... | 361/278 |
| 2003/0223176 A1 | 12/2003 | Fujii et al. | |
| 2004/0075158 A1* | 4/2004 | Nakayama ..................... | 257/532 |
| 2006/0171097 A1 | 8/2006 | Shimanouchi et al. | |
| 2007/0181411 A1* | 8/2007 | Ikehashi et al. ............... | 200/181 |
| 2008/0007888 A1* | 1/2008 | Morris ................... | H03H 7/463 361/281 |
| 2009/0051251 A1* | 2/2009 | Kawakubo et al. ........... | 310/332 |

FOREIGN PATENT DOCUMENTS

| | | |
|---|---|---|
| EP | 1 870 918 A1 | 12/2007 |
| EP | 1 950 777 A1 | 7/2008 |
| JP | 2003-264123 A | 9/2003 |
| JP | 2006-210843 A | 8/2006 |

(Continued)

OTHER PUBLICATIONS

Official Communication issued in International Patent Application No. PCT/JP2010/066643, mailed on Dec. 21, 2010.

*Primary Examiner* — Eric Thomas
*Assistant Examiner* — Arun Ramaswamy
(74) *Attorney, Agent, or Firm* — Keating & Bennett, LLP

(57) ABSTRACT

A variable capacitance device that operates properly at a point along a signal line through which a high-voltage RF signal passes while reducing a necessary DC voltage includes a substrate, a beam, and lower drive electrodes. The beam is connected to the substrate through a support portion. Lower drive electrodes and the beam generate a capacitance when a DC voltage is applied, and an electrostatic force due to this capacitance deforms the beam. The lower drive electrodes face the beam and are coupled to each other through the beam. An RF signal propagates between the lower drive electrodes.

8 Claims, 9 Drawing Sheets

(56) References Cited

FOREIGN PATENT DOCUMENTS

| | | |
|---|---|---|
| JP | 2008-005642 A | 1/2008 |
| JP | 2008-182134 A | 8/2008 |
| JP | 2008-277996 A | 11/2008 |
| JP | 2009-055683 A | 3/2009 |

* cited by examiner

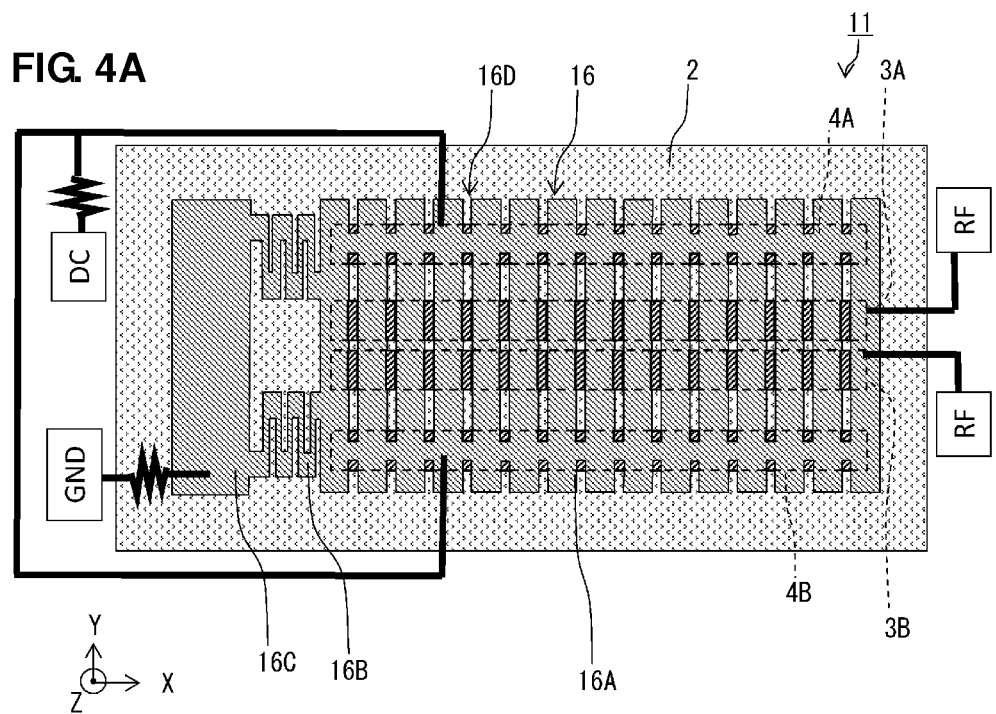
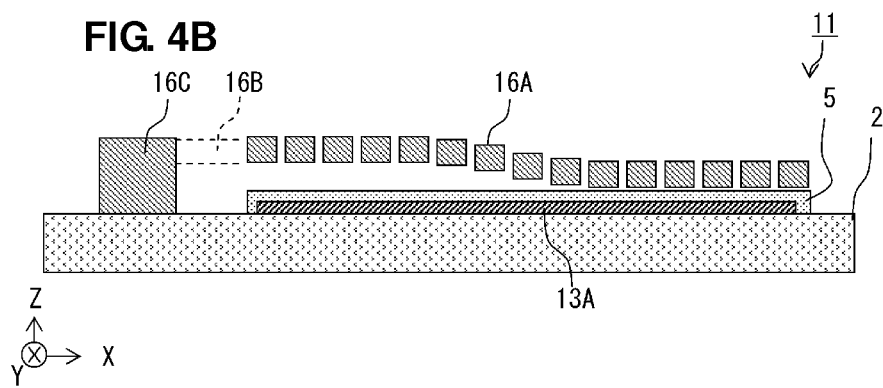

VARIABLE CAPACITANCE DEVICE

BACKGROUND OF THE INVENTION

1. Field of the Invention

The present invention relates to variable capacitance devices that change a capacitance using a microelectromechanical system (MEMS) component driven by an electrostatic force.

2. Description of the Related Art

Recently, some variable capacitance devices use a MEMS component that is driven by an electrostatic force (refer to Japanese Unexamined Patent Application Publication No. 2006-210843 and Japanese Unexamined Patent Application Publication No. 2008-182134).

FIGS. 1A to 1C illustrate an exemplary configuration of an existing variable capacitance device.

A variable capacitance device 101 includes movable plates 102 and 103. The movable plates 102 and 103, which have a double supported beam structure made of a conductive material, are arranged so as to be opposite each other. The movable plate 103 has a convex surface that is provided with a dielectric layer 104 and faces the movable plate 102. When a DC voltage is applied between the movable plates 102 and 103, an electrostatic force is generated which attracts the movable plates 102 and 103 toward each other. Thus, the distance between the movable plates 102 and 103 is decreased and the leading portion of the convex surface of the movable plate 103 comes into contact with the movable plate 102 with the dielectric layer 104 therebetween, whereby the capacitance of the variable capacitance device 101 is increased. When the DC voltage is changed, the contact area between the movable plates 102 and 103 is changed, whereby the capacitance is changed in accordance with the contact area.

When the existing variable capacitance device is provided at a point along a signal line through which a high-voltage RF signal passes, an electrostatic force is generated at an electrode to which an RF signal is applied in the variable capacitance device. This electrostatic force prevents proper deformation of the beam structure due to a DC voltage and, thus, the variable capacitance becomes unstable. When the spring constant of the beam structure is relatively high, deformation of the beam structure due to the RF signal can be suppressed. However, the deformation of the beam structure due to the DC voltage is suppressed at the same time and, thus, the DC voltage must be increased. As a result, for example, a voltage step-up circuit is required and the circuit structure of the variable capacitance device becomes more complex.

SUMMARY OF THE INVENTION

To overcome the problems described above, preferred embodiments of the present invention provide a variable capacitance device that properly operates at a point along a signal line through which a high-voltage RF signal passes while the necessary DC voltage is controlled to remain constant or substantially constant.

A variable capacitance device according to a preferred embodiment of the present invention preferably includes a substrate, a beam, a drive capacitance generating portion, and a signal capacitance generating portion. The beam is connected to the substrate at an end thereof. The drive capacitance generating portion is provided on the substrate and on the beam and deforms the beam in accordance with an electrostatic force due to a capacitance generated by the application of a DC voltage. The signal capacitance generating portion preferably includes a beam side signal electrode portion, a first substrate side signal electrode portion that faces the beam side signal electrode portion, and a second substrate side signal electrode portion that faces the beam side signal electrode portion and produces an RF signal that propagates between the first substrate side signal electrode portion and the second substrate side signal electrode portion. The first substrate side signal electrode portion and the second substrate side signal electrode portion are coupled to each other through the beam side signal electrode portion.

With this configuration, the beam is deformed in accordance with a DC voltage in the drive capacitance generating portion, and a capacitance in the signal capacitance generating portion is changed accordingly. When the first substrate side signal electrode portion and the second substrate side signal electrode portion are connected to a signal line through which a high-voltage RF signal passes, an electrostatic force acts between the beam side signal electrode portion and the first and second substrate side signal electrode portions. The signal capacitance generating portion preferably has a structure (hereinafter called an MIMIM structure) in which an RF signal propagates between the first and second substrate side signal electrode portions, which are coupled to each other through the beam side signal electrode portion, and an electrostatic force is effectively reduced due to the structure. Thus, by providing the signal capacitance generating portion separately from the drive capacitance generating portion, only an electrostatic force that acts on the signal capacitance generating portion can be reduced or minimized, while ensuring that an adequate electrostatic force acts on the drive capacitance generating portion. As a result, the variable capacitance device properly operates at a point along a signal line through which a high-voltage RF signal passes.

The drive capacitance generating portion may preferably include a beam side drive electrode portion and a substrate side drive electrode portion that faces the beam side drive electrode portion, and a DC voltage may be applied between the beam side drive electrode portion and the substrate side drive electrode portion. Further, the drive capacitance generating portion may preferably include a beam side drive electrode portion, a first substrate side drive electrode portion that faces the beam side drive electrode portion, and a second substrate side drive electrode portion that faces the beam side drive electrode portion, and a DC voltage may be applied between the first substrate side drive electrode portion and the second substrate side drive electrode portion, which are coupled to each other through the beam side drive electrode portion.

The drive capacitance generating portion may preferably have a structure (hereinafter called an MIM structure) in which a voltage is applied between the beam side drive electrode portion and the substrate side drive electrode portion or a MIMIM structure. Since an MIM structure generates an electrostatic force approximately four times as large as that of an MIMIM structure for the same electrode area, an electrostatic force sufficient to drive the beam can be generated while preventing or minimizing a DC voltage when the drive capacitance generating portion has an MIM structure. On the other hand, when the drive capacitance generating portion has a MIMIM structure, improvements in size reduction and configuration simplification is enabled by omitting electrical contacts from the beam side drive electrode portion.

Each of the signal capacitance generating portion and the drive capacitance generating portion preferably have a shape extending longitudinally along an axis direction of the beam and a configuration in which the electrode portion on the beam side and the electrode portion on the substrate side are arranged to contact each other with a dielectric layer therebetween.

Since the electrode portion on the beam side and the electrode portion on the substrate side are preferably arranged to contact each other with a dielectric layer therebetween, a capacitance between the two electrodes is significantly increased and the capacitance can be changed in accordance with the contact area between the two electrodes.

The beam preferably has a cantilever structure, for example.

With a cantilever structure, the spring constant of the beam and an area occupied by the beam are reduced as compared to a doubly supported beam. When the spring constant is reduced, the beam can be easily deformed and a relatively large capacitance can be generated using a relatively low DC voltage in the drive capacitance generating portion. In other words, a necessary electrostatic force can be generated using a relatively low DC voltage.

The drive capacitance generating portion is preferably configured to have a wider opposing electrodes area near a movable end of the beam.

With this configuration, a large electrostatic force due to a DC voltage can be produced on the moving end of the beam having a cantilever structure, whereby the bending of the beam is increased. Thus, a relatively large capacitance can be generated using a relatively low DC voltage in the drive capacitance generating portion. In other words, a necessary electrostatic force can be generated using a relatively low DC voltage.

The beam preferably has a configuration in which a thickness of the beam in a cross-section perpendicular to an axis direction of the beam is uniform or substantially uniform along the axis direction and a plurality of portions having a relatively small cross-sectional area perpendicular to the axis direction are arranged in the axis direction.

When the cross-sectional area of the beam is discontinuous rather than constant, a necessary capacitance can be obtained by locally increasing an opposing electrodes area in the beam. However, the beam is likely to become inclined as the beam gets closer to the substrate, whereby a change in capacitance may be unstable. Thus, by providing a configuration in which a plurality of portions having a relatively small cross-sectional area are arranged along the axis direction, the inclination when the beam gets closer to the substrate is reduced, whereby the stability of the change in capacitance is improved.

The beam may preferably be made of a conductive material, for example, and a signal cutting off element may preferably be connected to the drive capacitance generating portion. Alternatively, the beam may preferably be made of an insulating material, and an electrode that defines the drive capacitance generating portion or the signal capacitance generating portion may preferably be provided on a surface of the beam. Preferably, the material is W (tungsten) or Mo (molybdenum), for example, that has a high melting point and that does not have a rough surface caused by a heat load (for example, 200° C.-430° C.) at the time of, for example, connection of an anode, connection of metals such as Au—Au, Au—Sn, Cu—Sn, and BiNiAu, or diffusion bonding of Si—Si, Si and a dielectric layer, for example.

When the beam is made of a conductive material, electrodes need not be provided on the beam. Thus, the beam need not have a structure in which different materials are bonded to each other, whereby bowing caused by a difference in internal stress or a change in capacitance due to a difference in linear expansion is reduced or minimized, and a high-accuracy variable capacitance with very little variations in characteristics is obtained. When the beam is made of an insulating material, a signal cut-off element need not be connected to the drive capacitance generating portion.

According to various preferred embodiments of the present invention, since the signal capacitance generating portion having an MIMIM structure is provided separately from the drive capacitance generating portion, only an electrostatic force produced by the signal capacitance generating portion which causes deformation of the beam can be reduced or minimized while ensuring that a sufficient electrostatic force still acts on the drive capacitance generating portion. As a result, the variable capacitance device operates properly at a point along a signal line through which a high-voltage RF signal passes.

The above and other elements, features, steps, characteristics, and advantages of the present invention will become more apparent from the following detailed description of the preferred embodiments with reference to the attached drawings.

BRIEF DESCRIPTION OF THE DRAWINGS

FIGS. 4A and 4B illustrate an exemplary configuration of a variable capacitance device according to a second preferred embodiment of the present invention.

DETAILED DESCRIPTION OF THE PREFERRED EMBODIMENTS

An exemplary configuration of a variable capacitance device according to a first preferred embodiment of the present invention will be described below.

Figure 1A:
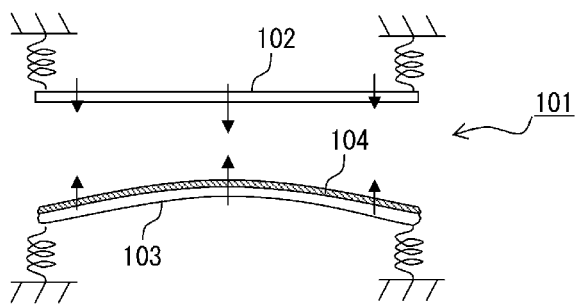
FIGS. 1A to 1C illustrate an exemplary configuration of an existing variable capacitance device.
Figure 1B:
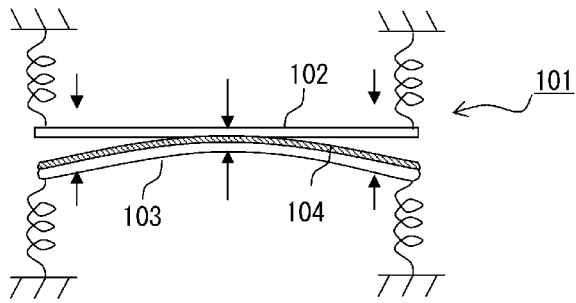
Figure 1C:
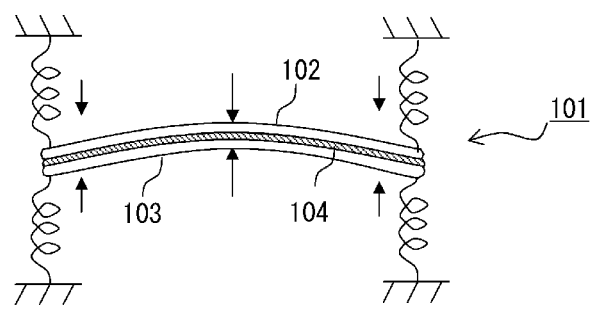
Figure 2A:
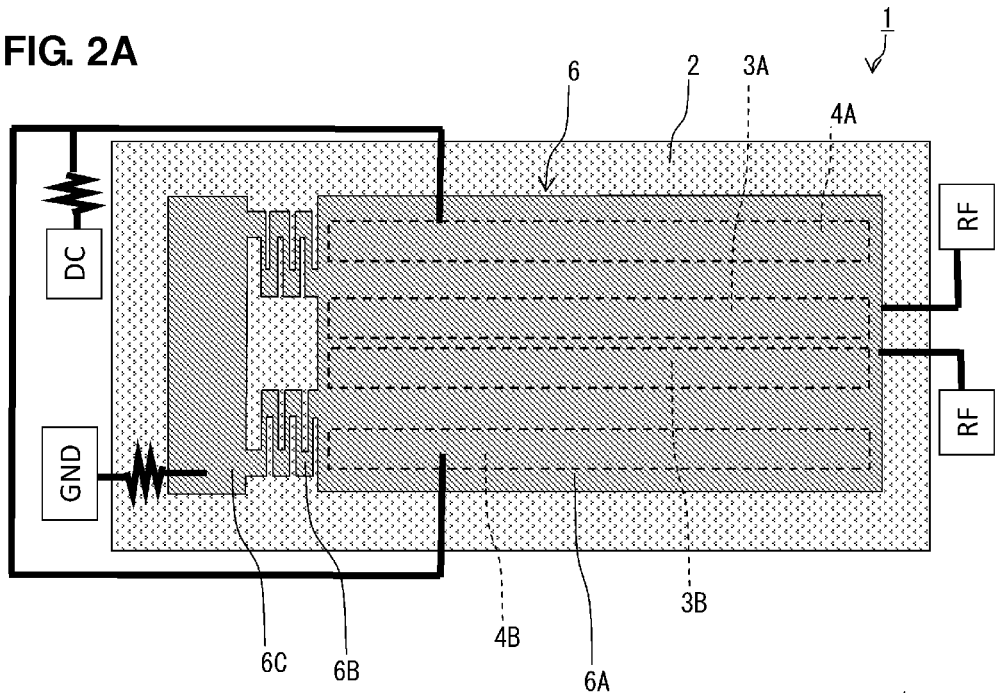
FIGS. 2A to 2C illustrate an exemplary configuration of a variable capacitance device according to a first preferred embodiment of the present invention.
Figure 2B:
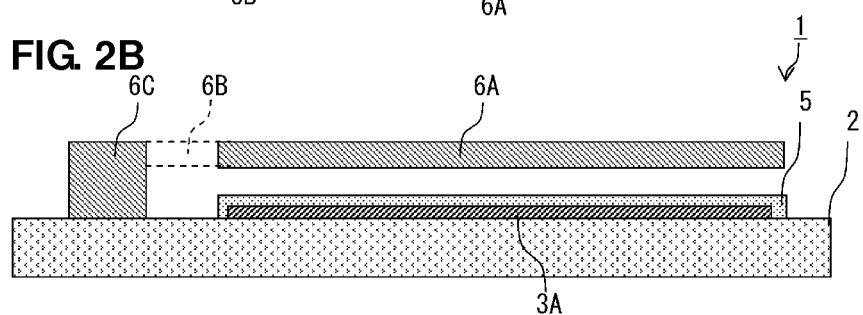
Figure 2C:
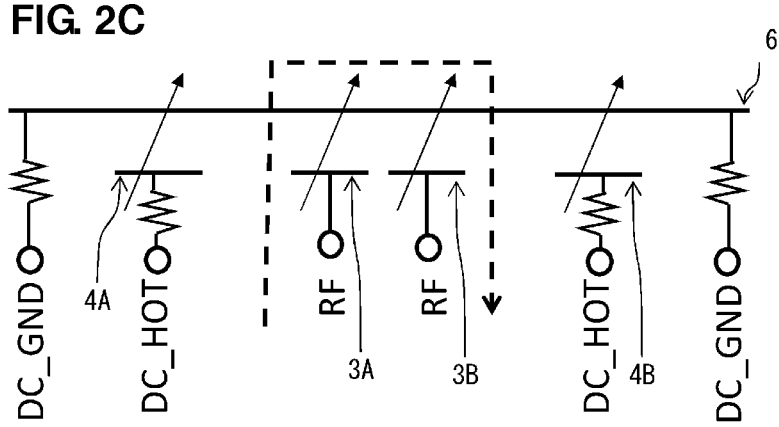
Figure 3A:
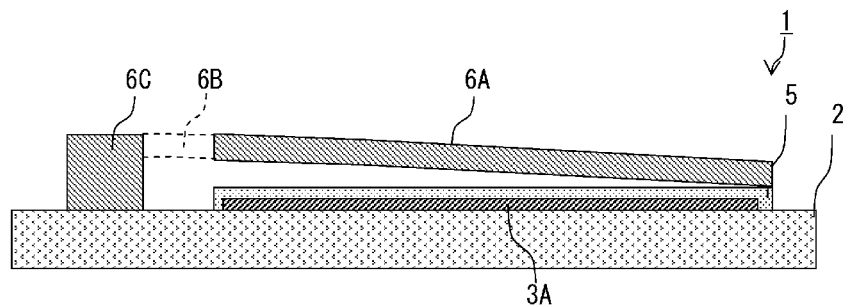
FIGS. 3A to 3D illustrate an exemplary operation of a variable capacitance device.
Figure 3B:
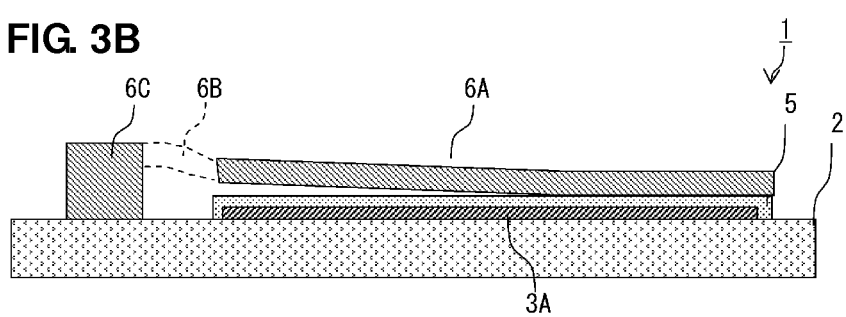
Figure 3C:
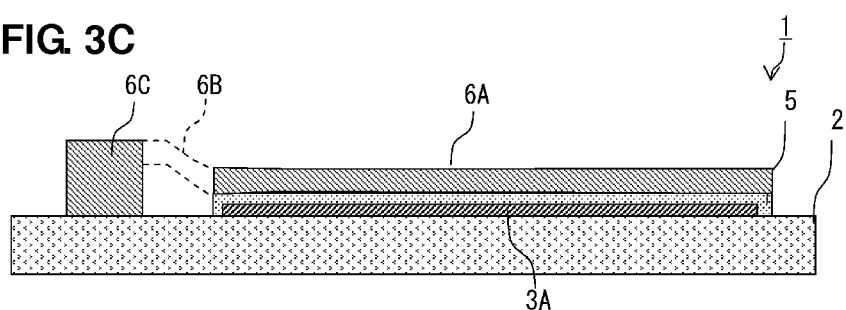
Figure 3D:
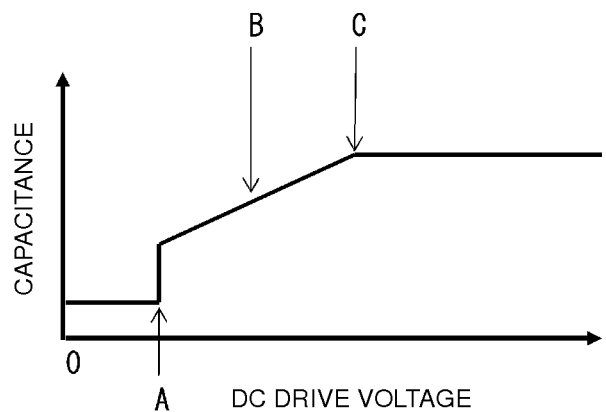

FIG. 2A is a plan view of a variable capacitance device 1. FIG. 2B is a cross-sectional side view of the variable capacitance device 1. FIG. 2C is an equivalent circuit diagram of the variable capacitance device 1.

The variable capacitance device 1 preferably includes a substrate 2, lower drive electrodes 3A, 3B, 4A, and 4B, a beam 6, and a dielectric layer 5. The substrate 2 is preferably a glass substrate and the beam 6 is preferably made of a low-resistance Si substrate (conductive material) with a resistivity of 0.0026 Ω-cm, for example. The dopant used is preferably P (phosphorus), but may be As (arsenic) or B (boron), for example.

The beam 6 is preferably shaped like a flat plate with an opening, and includes two beam-shaped portions 6B, a movable portion 6A, and a support portion 6C. The support portion 6C is preferably rectangular or substantially rectangular at the left end of the beam 6 as shown in FIGS. 2A and 2B, and is connected to the substrate 2. The beam-shaped portions 6B and the movable portion 6A are supported by the support portion 6C so as to be spaced apart from the substrate 2. The movable portion 6A is provided on the right side of the beam 6 as shown in FIGS. 2A and 2B and is preferably rectangular or substantially rectangular so as to provide a large opposing electrodes area. The two beam-shaped portions 6B, which preferably have a meandering line shape, for example, connect the support portion 6C and the movable portion 6A to each other. The two beam-shaped portions 6B have a cantilever structure that supports the support end of the beam 6 as a rotatable end and not a fixed end.

The lower drive electrodes 3A, 3B, 4A, and 4B are preferably shaped like long lines extending in the axis direction (horizontal direction in FIGS. 2A and 2B) of the beam 6 and are provided on the upper surface of the substrate 2. The dielectric layer 5 is provided on the substrate 2 so as to cover the lower drive electrodes 3A, 3B, 4A, and 4B. The lower drive electrodes 4A and 4B are respectively arranged outwardly of the lower drive electrodes 3A and 3B. The lower drive electrode 3A is connected to an RF signal input terminal (or output terminal) and the lower drive electrode 3B is connected to an RF signal output terminal (or input terminal). The lower drive electrodes 4A and 4B are connected to DC voltage terminals through a resistance element to cut off a signal. The beam 6 is connected to the ground GND through a resistance element to cut off a signal.

The lower drive electrodes 4A and 4B face the movable portion 6A of the beam 6 with the dielectric layer 5 therebetween, whereby a drive capacitance generating portion according to a preferred embodiment of the present invention is provided. The lower drive electrodes 4A and 4B respectively correspond to first and second substrate side drive electrode portions, and areas, including the vicinity, of the beam 6 facing the lower drive electrodes 4A and 4B that correspond to a beam side drive electrode portion. In this drive capacitance generating portion, a capacitance is generated due to a DC voltage and the ground, and the capacitance generates an electrostatic force that causes deformation of the beam 6. This structure is an MIM structure including the lower drive electrodes 4A and 4B, the beam 6, and an air gap between the beam 6 and the lower drive electrodes 4A and 4B. A signal (voltage) is directly applied between the opposing beam 6 and the lower drive electrodes 4A and 4B, and an electrostatic force per area is greater than that of an MIMIM structure described below. Thus, the MIM structure has an advantage in terms of decreasing the electrode areas.

The lower drive electrodes 3A and 3B face the movable portion 6A of the beam 6 with the dielectric layer 5 therebetween, whereby a signal capacitance generating portion is provided. The lower drive electrodes 3A and 3B respectively correspond to first and second substrate side signal electrode portions, and an area, including the vicinity, of the beam 6 facing the lower drive electrodes 3A and 3B corresponds to a beam side signal electrode portion. This signal capacitance generating portion provides, between the lower drive electrodes 3A and 3B, a capacitance that changes in accordance with the contact area between the movable portion 6A and the dielectric layer 5. This structure is an MIMIM structure in which the lower drive electrodes 3A and 3B, to which a signal is supplied, are coupled to each other through the beam 6, and has an advantage in terms of preventing the deformation of the beam 6 due to a high-voltage RF signal, since an electrostatic force per area is less than that of an MIM structure.

Here, equations for calculating a capacitance and an electrostatic force in an MIMIM structure or an MIM structure are described below:

$$\text{MIMIM structure: } C_0 = \frac{1}{2} \frac{\varepsilon_0 \varepsilon_r \frac{A}{2}}{z} = \frac{1}{4} \frac{\varepsilon_0 \varepsilon_r A}{z} \quad \text{Equation 1}$$

$$F = -\frac{1}{2} \frac{\partial C}{\partial z} V_{dr}^2 = \frac{\varepsilon_0 \varepsilon_r A}{8z^2} V_{dr}^2$$

$$\text{MIM structure: } C_0 = \frac{\varepsilon_0 \varepsilon_r A}{z} \quad \text{Equation 2}$$

$$F = -\frac{1}{2} \frac{\partial C}{\partial z} V_{dr}^2 = \frac{\varepsilon_0 \varepsilon_r A}{2z^2} V_{dr}^2$$

Electrostatic forces F acting on the beam 6 are determined by Equations 1 and 2, and are proportional to an opposing electrodes area A and the square of an applied voltage V, and inversely proportional to a distance z between opposing electrodes. In an MIMIM structure, the capacitance and electrostatic force are approximately one-fourth those of an MIM structure for the same opposing electrodes area, as shown by Equations 1 and 2. Thus, it is preferable to use an MIM structure for the drive capacitance generating portion where a large electrostatic force is required and an MIMIM structure for the signal capacitance generating portion where reduction or prevention of an electrostatic force is required.

In other words, electrostatic forces generated between the movable portion 6A and the lower drive electrodes 3A and 3B can be reduced or minimized even when an high-voltage RF signal is applied between the lower drive electrodes 3A and 3B by using an MIMIM structure for the signal capacitance generating portion and by using an MIM structure for the drive capacitance generating portion.

FIGS. 3A to 3D illustrate the operation of the variable capacitance device 1 caused by application of a DC voltage. The bending of the beam 6 increases with increasing DC voltage applied to the lower drive electrodes 4A and 4B, and the tip of the movable portion 6A comes into contact the dielectric layer 5 (refer to FIG. 3A). At this time, the lower drive electrodes 3A and 3B and the beam 6 face each other with the dielectric layer 5 therebetween, whereby a capacitance in the signal capacitance generating portion significantly increases. As the DC voltage applied to the lower drive electrodes 4A and 4B further increases, the bending of the beam 6 further increases, whereby the contact area between the movable portion 6A and the dielectric layer 5 continues to expand (refer to FIG. 3B). As a result, the capacitance in the signal capacitance generating portion continues to increase. When the DC voltage applied to the lower drive electrodes 4A and 4B reaches a predetermined value, the entire area of the movable portion 6A contacts the dielectric layer 5 (refer to FIG. 3C). After this, the capacitance in the signal capacitance generating portion remains constant even when the DC voltage is increased beyond the predetermined value.

Next, an exemplary configuration of a variable capacitance device according to a second preferred embodiment of the present invention will be described. FIG. 4A is a plan view of a variable capacitance device 11 according to the second preferred embodiment, and FIG. 4B is a cross-sectional view of the variable capacitance device 11. The variable capacitance device 11 includes a beam 16 having a shape that is different from that of the variable capacitance device 1.

The beam 16 preferably includes a movable portion 16A, beam-shaped portions 16B, and a support portion 16C. The movable portion 16A preferably has a uniform thickness in a direction Z perpendicular to the substrate 2, and is provided with a plurality of slit forming portions 16D. In each of the slit forming portions 16D, a portion of the movable portion 16A has been cut out while leaving two regions intact as beam-shaped regions and which has a small cross-sectional area in a direction perpendicular to the main axis direction X. The slit forming portions 16D are preferably arranged at equal or substantially equal intervals in the main axis direction X of the movable portion 16A.

In the variable capacitance device 1, the entire beam is likely to become more inclined as the beam gets closer to the substrate, whereby the change in capacitance may become unstable. In the variable capacitance device 11, the beam 16 is more smoothly deformed than in the variable capacitance device 1 by arranging the plurality of the slit forming portions 16D in the main axis direction X. As a result, as illustrated in FIG. 4B, the contact area between the movable portion 16A and the dielectric layer 5 changes in accordance with a DC voltage while the inclination when the movable portion 16A of the beam 16 gets closer to the substrate 2 is reduced, whereby the stability of the change in capacitance is improved.

Figure 5:
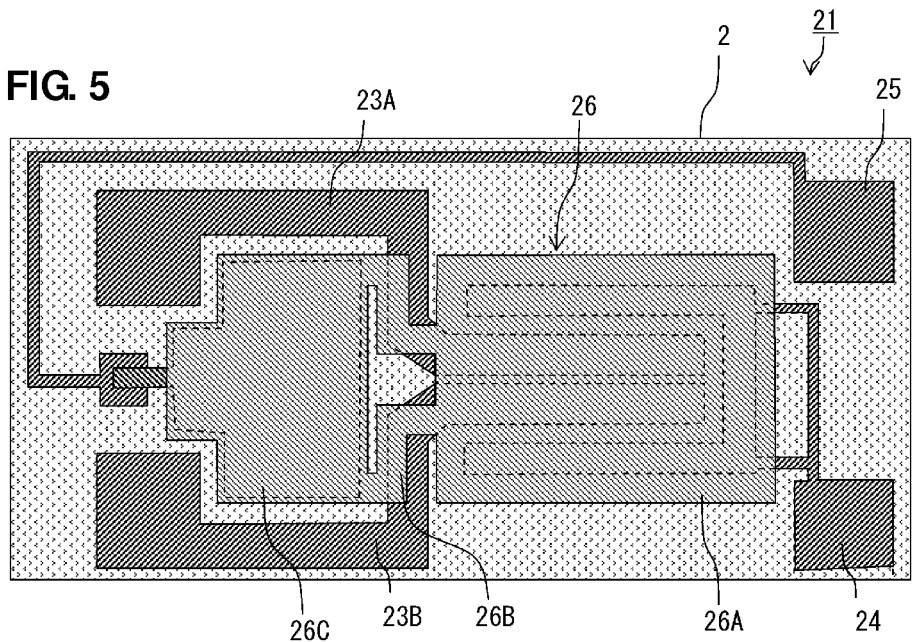
FIG. 5 illustrates an exemplary configuration of a variable capacitance device according to a third preferred embodiment of the present invention.

Next, an exemplary configuration of a variable capacitance device according to a third preferred embodiment of the present invention will be described. FIG. 5 is a plan view of a variable capacitance device 21 according to the third preferred embodiment. The variable capacitance device 21 is different from the variable capacitance device 1 primarily in terms of the shape of lower drive electrodes and the shape of beam-shaped portions.

The variable capacitance device 21 preferably includes lower drive electrodes 23A, 23B, 24, and 25 and a beam 26. The lower drive electrode 25 is provided on the bottom surface of a support portion 26C of the beam 26, and connects the beam 26 to the ground. The lower drive electrodes 23A and 23B are connected to high-frequency signal input and output terminals and the line portions thereof face a movable portion 26A of the beam 26. The lower drive electrode 24 is connected to a DC voltage and the U-shaped line portion thereof faces the movable portion 26A of the beam 26.

In the variable capacitance device 21, since the lower drive electrode 24 to which a DC voltage is applied preferably has a U shape, for example, an opposing electrodes area in the vicinity of the tip of the movable portion 26A of the beam 26 is increased, whereby an electrostatic force that acts on the vicinity of the tip of the movable portion 26A is increased. As a result, the beam 26 can be significantly deformed even when the DC voltage is reduced.

Figure 6A:
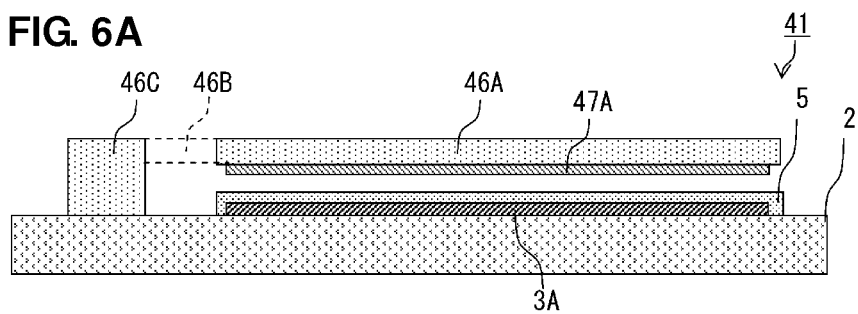
FIGS. 6A and 6B illustrate an exemplary configuration of a variable capacitance device according to a fourth preferred embodiment of the present invention.
Figure 6B:
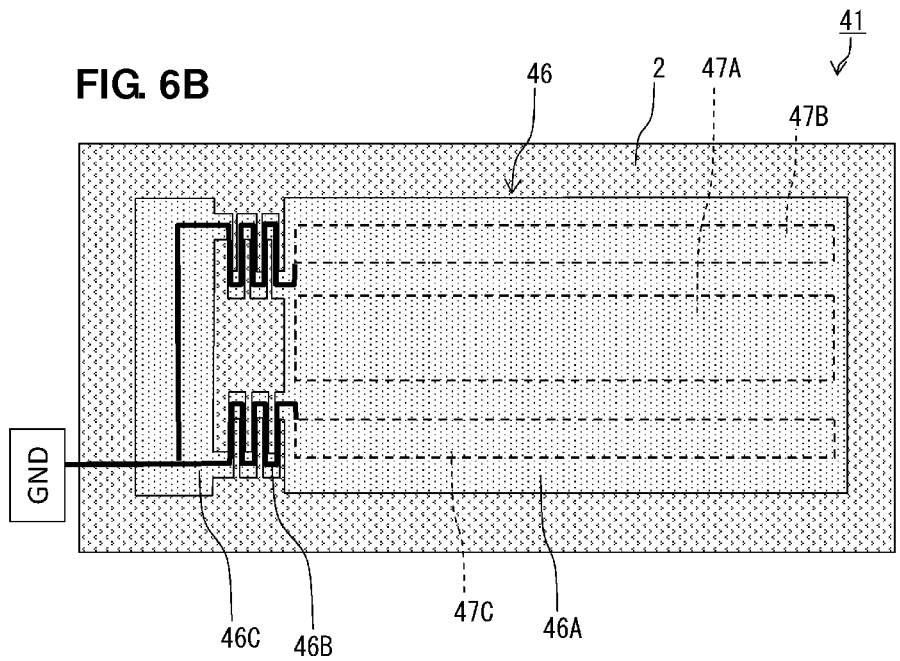

Next, an exemplary configuration of a variable capacitance device according to a fourth preferred embodiment of the present invention will be described. FIG. 6A is cross-sectional side view of a variable capacitance device 41 according to the fourth preferred embodiment, and FIG. 6B is a plan view of the variable capacitance device 41. Unlike the variable capacitance device 1 described above, the variable capacitance device 41 preferably includes a beam 46 that is made of an insulating material, such as a high-resistance Si substrate, for example, and upper drive electrodes 47A, 47B, and 47C are provided on the bottom surface of the beam 46.

Note that when a high-resistance Si substrate is used as the beam, the resistivity thereof is preferably about 1000 Ω-cm or higher, for example.

The upper drive electrode 47A is provided on the bottom surface of a movable portion 46A of the beam 46 so as to face the lower drive electrodes 3A and 3B. The upper drive electrode 47B is provided on the bottom surface of the movable portion 46A so as to face the lower drive electrode 4A and is connected to the ground GND. The upper drive electrode 47C is provided on the bottom surface of the movable portion 46A so as to face the lower drive electrode 4B and is connected to the ground GND.

By constructing the beam 46 using an insulating material in this manner, it is possible to provide the upper drive electrodes 47B and 47C that define the drive capacitance generating portion separately from the upper drive electrode 47A that define the signal capacitance generating portion. As a result, an RF signal that propagates through the signal capacitance generating portion is electrically separated from a DC voltage that is applied to the drive capacitance generating portion, whereby the ground GND or a DC voltage source can be connected to the lower drive electrodes without using a resistance element to cut off a signal.

Note that upper drive electrodes may be further provided while constructing the beam 46 using a low-resistance Si substrate as in the variable capacitance device 1. In this case, a Q factor can be improved by reducing the resistance component of a variable capacitance that is generated by the signal capacitance generating portion.

Figure 7:
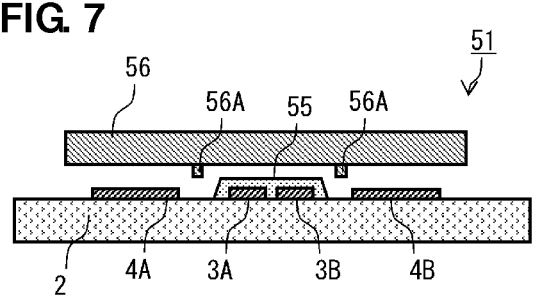
FIG. 7 illustrates an exemplary configuration of a variable capacitance device according to a fifth preferred embodiment of the present invention.
Figure 8A:
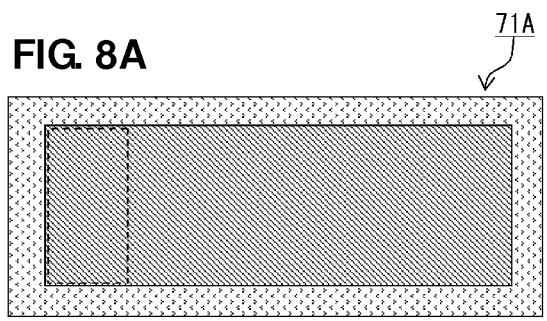
FIGS. 8A to 8D illustrate an exemplary configuration of a variable capacitance device according to a sixth preferred embodiment of the present invention.
Figure 8B:
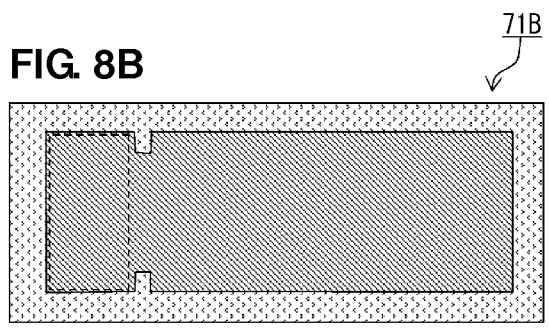
Figure 8C:
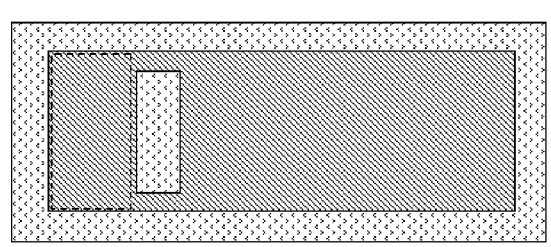
Figure 8D:
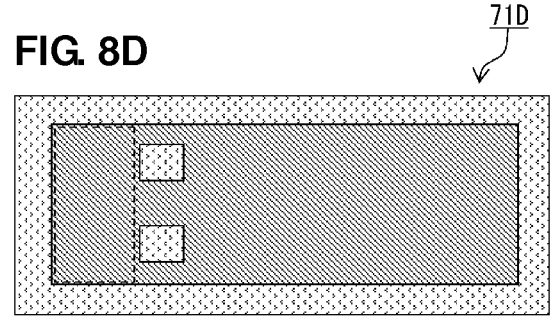

Next, an exemplary configuration of a variable capacitance device according to a fifth preferred embodiment of the present invention will be described. FIG. 7 is a cross-sectional front view of a variable capacitance device 51 according to the fifth preferred embodiment. The variable capacitance device 51 is different from the variable capacitance device 1 described above in terms of the shape of a dielectric layer 55 and the shape of a beam 56.

The dielectric layer 55 is preferably arranged so as to cover the lower drive electrodes 3A and 3B and to expose the lower drive electrodes 4A and 4B. In addition, flanges 56A are provided on the bottom surface of the beam 56 so as to prevent the beam 56 from contacting the lower drive electrodes 4A and 4B that directly face the beam 56. The variable capacitance device 51 may preferably be configured in this manner.

Next, exemplary configurations of variable capacitance devices according to a sixth preferred embodiment of the present invention will be described. FIGS. 8A to 8D include plan views of variable capacitance devices according to the sixth preferred embodiment. Unlike the variable capacitance device 1 described above, a variable capacitance device 71A shown in FIG. 8A preferably includes an approximately rectangular beam in plan view. Unlike the variable capacitance device 1 described above, a variable capacitance device 71B shown in FIG. 8B preferably includes an approximately rectangular beam in plan view and a cut out portion is provided near the boundary between the support portion and movable portion of the beam. Unlike the variable capacitance device 1 described above, a variable capacitance device 71C shown in FIG. 8C preferably includes an approximately rectangular beam in plan view and an opening is provided near the boundary between the support portion and movable portion of the beam. Unlike the variable capacitance device 1 described above, a variable capacitance device 71D shown in FIG. 8D preferably includes an approximately rectangular beam in plan view and two openings are provided near the boundary between the support portion and movable portion of the beam. Preferred embodiments of the present invention can preferably be achieved irrespective of the particular shapes of the beam in plan view, as in these examples.

Figure 9A:
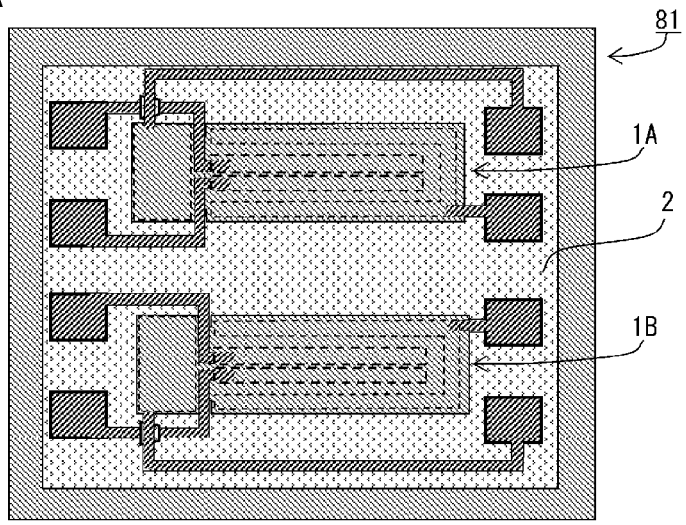
FIGS. 9A to 9D illustrate an exemplary configuration of a VMD apparatus according to a seventh preferred embodiment of the present invention.
Figure 9B:
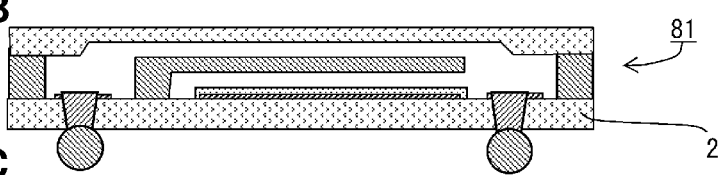
Figure 9C:
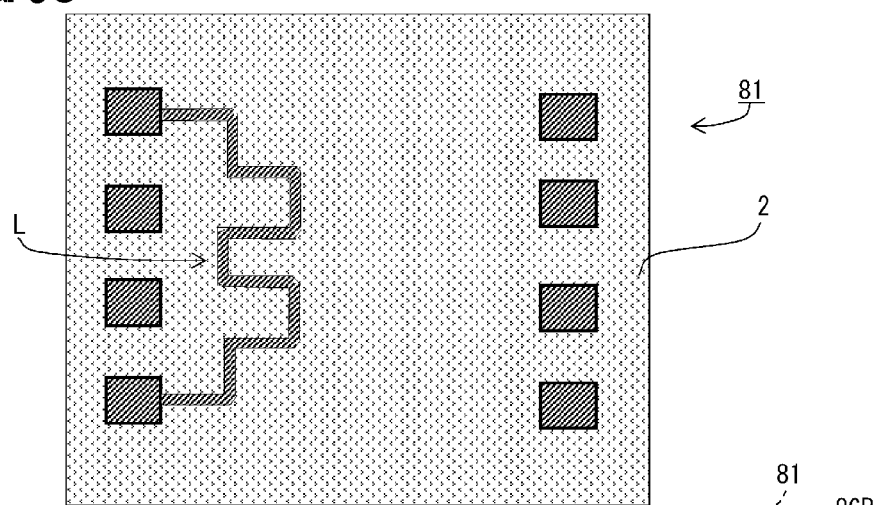
Figure 9D:
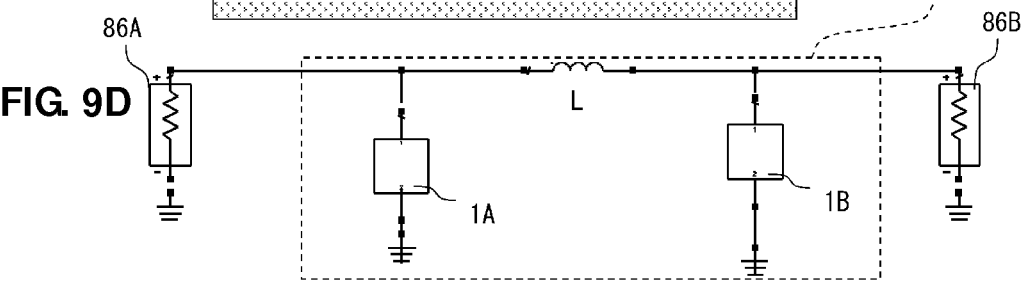

Next, a variable matching device (VMD) apparatus including a variable capacitance device according to a seventh preferred embodiment of the present invention will be described. FIG. 9A is a plan view of a VMD apparatus 81 according to the seventh preferred embodiment, FIG. 9B is a cross-sectional side view, FIG. 9C is a bottom view, and FIG. 9D is an equivalent circuit diagram. The VMD apparatus 81 preferably has a package structure in which variable capacitance devices 1A and 1B are provided on the substrate 2, and is provided with a line that defines an inductor L on the bottom surface of the substrate 2. The signal capacitance generating portions of the variable capacitance devices 1A and 1B are respectively connected between the two ends of the inductor L and the ground.

Referring to FIG. 9D, the VMD apparatus 81 is inserted into a signal line between a first external load 86A and a second external load 86B, and performs impedance matching between the first external load 86A and the second external load 86B. By using the VMD apparatus in this manner, the impedances are matched through appropriate setting of the variable capacitances of the variable capacitance devices 1A and 1B, whereby the size of the VMD apparatus 81 can be reduced.

Figure 10:
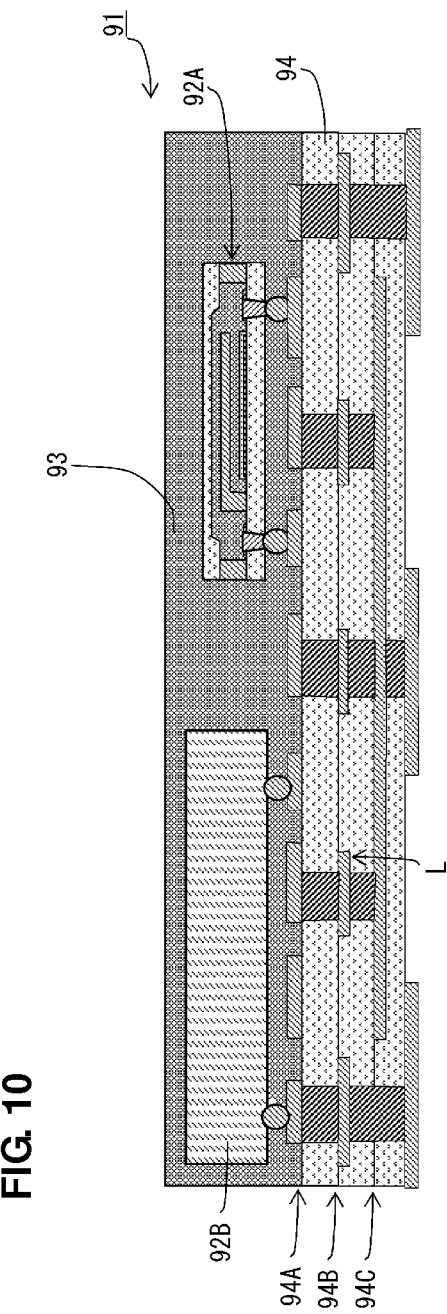
FIG. 10 illustrates an exemplary configuration of a VMD apparatus according to an eighth preferred embodiment of the present invention.

Next, a VMD apparatus according to an eighth preferred embodiment of the present invention will be described. FIG. 10 is a cross-sectional side view of a VMD apparatus 91 according to the eighth preferred embodiment. The VMD apparatus 91 preferably includes a variable capacitance device 92A, a drive IC 92B, a resin mold 93, and a printed circuit board 94. The variable capacitance device 92A and the drive IC 92B are SMD mounted on the printed circuit board 94, and are molded by the resin mold 93. The printed circuit board 94 preferably is a multi-layer board, and mounting electrodes for the variable capacitance device 92A and the drive IC 92B are provided on a component mounting surface 94A of the printed circuit board 94. An inductor forming surface 94B of the printed circuit board 94 preferably includes the inductor L provided thereon. The inductor L and the variable capacitance device 92A define an equivalent circuit similar to that of the VMD apparatus 81 described above. A shield electrode is provided on a shield forming surface 94C of the printed circuit board 94. Preferred embodiments of the present invention enable the VMD apparatus 91 to be preferably configured in this manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A variable capacitance device comprising:
   a substrate;
   a beam connected to the substrate at a connection end of the beam;
   a drive capacitance generating portion provided on the substrate and the beam and arranged to deform the beam in accordance with an electrostatic force caused by a capacitance generated by application of a DC voltage; and
   a signal capacitance generating portion including:
   a beam side signal electrode portion provided on the beam;
   a first substrate side signal electrode portion provided on the substrate and arranged to face the beam side signal electrode portion; and
   a second substrate side signal electrode portion provided on the substrate and arranged to face the beam side signal electrode portion; wherein
   an RF signal propagates between the first substrate side signal electrode portion and the second substrate side signal electrode portion, which are coupled to each other through the beam side signal electrode portion; wherein
   the signal capacitance generating portion is provided separately from the drive capacitance generating portion;
   the drive capacitance generating portion provided on the substrate and the first and second substrate side signal electrode portions are arranged such that longitudinal dimensions of each of the drive capacitance generating portion and the first and second substrate side signal electrode portions extend in a longitudinal axis direction of the beam; and
   the beam is made of a conductive material and a signal cutting off element is connected to the drive capacitance generating portion.

2. The variable capacitance device according to claim 1, wherein the drive capacitance generating portion includes:
   a beam side drive electrode portion provided on the beam; and
   a substrate side drive electrode portion provided on the substrate and arranged to face the beam side drive electrode portion; and
   a DC voltage is applied between the beam side drive electrode portion and the substrate side drive electrode portion.

3. The variable capacitance device according to claim 1, wherein the drive capacitance generating portion includes:
   a beam side drive electrode portion provided on the beam;
   a first substrate side drive electrode portion provided on the substrate and arranged to face the beam side drive electrode portion; and
   a second substrate side drive electrode portion provided on the substrate and arranged to face the beam side drive electrode portion; and
   a DC voltage is applied between the first substrate side drive electrode portion and the second substrate side drive electrode portion, which are coupled to each other through the beam side drive electrode portion.

4. The variable capacitance device according to claim 1, wherein each of the signal capacitance generating portion and the drive capacitance generating portion has a shape extending longitudinally along the longitudinal axis direction of the beam, and the electrode portion on the beam side and the electrode portion on the substrate side are arranged to contact each other with a dielectric layer therebetween.

5. The variable capacitance device according to claim 1, wherein the beam has a cantilever structure.

6. The variable capacitance device according to claim 5, wherein the drive capacitance generating portion has a wider opposing electrodes area at an area of a movable end of the beam than at an area of a fixed end of the beam.

7. The variable capacitance device according to claim 1, wherein the beam has a thickness in a cross-section perpendicular to the longitudinal axis direction of the beam that is uniform along the longitudinal axis direction, and a plurality of portions having a small cross-sectional area perpendicular to the longitudinal axis direction that are arranged in the longitudinal axis direction.

8. The variable capacitance device according to claim 1, wherein the beam is made of an insulating material, and an electrode that defines the drive capacitance generating portion or the signal capacitance generating portion is provided on a surface of the beam.

* * * * *